United States Patent [19]

Gunn

[11] Patent Number: 4,961,362

[45] Date of Patent: Oct. 9, 1990

[54] CHORD KEY CALCULATOR ASSEMBLY

[76] Inventor: David Gunn, 928 NE. 23 Dr., Ft. Lauderdale, Fla. 33305

[21] Appl. No.: 298,715

[22] Filed: Jan. 19, 1989

[51] Int. Cl.$^5$ ............................................. G09B 15/02
[52] U.S. Cl. ...................................................... 84/474
[58] Field of Search ......................... 84/471, 473, 474

[56] References Cited

U.S. PATENT DOCUMENTS

| | | | |
|---|---|---|---|
| 1,431,972 | 10/1922 | Mears | 84/474 |
| 3,481,241 | 12/1969 | Gaillard | 84/474 |
| 3,728,932 | 4/1973 | Leonard | 84/473 |
| 3,903,782 | 9/1975 | Leonard | 84/471 |
| 4,074,607 | 2/1978 | Bond | 84/471 SR |
| 4,503,748 | 3/1985 | Barber | 84/474 |

FOREIGN PATENT DOCUMENTS

| | | | |
|---|---|---|---|
| 2254846 | 7/1975 | France | 84/474 |
| 465996 | 5/1937 | United Kingdom | 84/474 |

Primary Examiner—Lawrence R. Franklin
Attorney, Agent, or Firm—Malloy & Malloy

[57] ABSTRACT

A hand manipulable calculator assembly specifically designed to calculate chord/key construction in musical composition and incorporating a chord wheel, a note/-key wheel, a major/minor wheel all being rotatably mounted relative to one another and to a fixed wheel of a support frame wherein conversion means in the form of color coded charts further are provided to determine intended chord/key calculations.

20 Claims, 4 Drawing Sheets

CHORD KEY CALCULATOR ASSEMBLY

BACKGROUND OF THE INVENTION

1. Field of the Invention

This invention relates to a calculator assembly which is mechanically operable through manipulation of certain rotatable scales comprising the assembly using the hands of the operator for the determination of chord-/key calculation of musical composition.

2. Calculator assemblies used to calculate and analyze on a more specific basis chords, keys, etc. of musical composition are quite well known in the prior art. Typically, such devices are used in analyzing musical composition when a user thereof encounter chords that appear to be very complicated. Such more careful analysis is required when such complicated chords bear no relationship with the key signature in which the piece of music is composed or the rest of the composition. Many chords which are used in particular key signatures are chosen from specific major and minor chords which are related to the key signature but are frequently embellished to the point where they are no longer immediately recognizable. It is obviously desirable for a student of music to be thoroughly drilled in the major and minor chords in a particular key signature and continue work analysis through as many advanced variations of these chords as possible. It is also desirable to repeat this process using all the key signatures.

The particular chords and notes used in progressions of various kinds in music can ordinarily be selected from several chords and notes and produce substantially the same musical effect. Some arrangements however will be considerably easier to play than others. More particularly, one chord in a musical score may be played in any of its inversions or in the root position and sound somewhat the same. The difficulty in determining the next chord in the score may, and usually does, depend on the particular inversion which is used from the prior chord.

It is therefore a recognized difficulty even for experienced composers to recall all of the possible inversions of the numerous chords one may use and then to select from these inversions those which produce the most efficient sequence.

The prior art is replete with numerous calculator assemblies determining various composition, chord/key common inversions, etc. The following U.S. Patents are representative of prior art attempts to overcome certain problems as set forth above and well recognized in the prior art.

Leonard, U.S. Pat. No. 3,884,113 discloses a slide rule chord indicator having an upper dial which is rotatable to display the root tones of the related major and minor chords of any chosen key signature. The plurality of indicators are included thereon which select the particular scale tones of the related chords from named scale tones on a replaceable sheet also associated with the subject assembly.

Leonard also discloses (U.S. Pat. No. 3,884,114) an aid for teaching the related major and minor chords and requisite scale tone structure in each key signature. The apparatus comprises a rotatable dial mounted on the front panel of an envelope having a peripheral display of the scale tone names arranged according to the cycle of fourths and a plurality of movable sheets individually insertable in the envelope having an arcuate array of indicia denoting the scale tone structures of various major and minor chord types.

Further, Leonard, U.S. Pat. No. 3,908,506, discloses a device for teaching music students the correspondence between the scale tone intervals of a chord as measured with the reference of the chromatic scale and the diatonic scale. An outer rotatable disc and a concentrically and rotatably mounted inner disc are secured together wherein the inner disc has a continuous peripheral display of chord symbols of a particular chord in the various key signatures. The discs are rotatable relative to one another until the chromatic scale indicia are adjacent to a particular chord symbol on the outer disc and the subject processes are generally repeated for the diatonic scale.

Leonard also discloses in U.S. Pat. No. 4,002,097 a chord progression selector comprising a plurality of dials of increasing diameter wherein each represents a particular chord type having a peripheral array of the scale tone names of the chord in its root and inverted positions arranged in sections. Upon alignment of various sectors of the discs a given chord progression can be arranged according to the most easily played chord inversions.

While the above noted calculator assemblies are operative for their intended functions, there is still a need in this area for a more versatile and comprehensive calculator assembly which accomplishes the intended goals and functions and overcomes the prior art problems without adding undue complexity to the structure of the calculator and its process for operation.

SUMMARY OF THE INVENTION

The present invention relates to a chord/key calculator for musical composition comprising a main support frame having a fixed wheel secured to a base in substantially coplanar relation thereto. The fixed wheel is specifically structured to include a plurality of first indicia segments disposed substantially continuously about the fixed wheel and a window means specifically placed on the fixed wheel so as to allow viewing therethrough to various alignable indicia formed on a chord wheel, to be described in greater detail hereinafter.

The base of the frame is fixedly attached to extend outwardly from a peripheral portion thereof and the base includes a color coded chart for the conversion of roots and inversion, also to be described in greater detail hereinafter.

The subject calculator assembly further comprises a chord wheel having a larger diameter than the fixed wheel and including a second plurality of indicia segments formed continuously and in spaced relation to one another about its periphery. This second plurality of indicia segments are divided into a first portion, a second portion and a third portion disposed radially inward, successively, relative to one another wherein all the portions of the second plurality of indicia segments have annular configurations so as to extend continuously about the annular face of the chord wheel. Further, each of the portions of the second plurality of segments are alignable relative to the window means in order to accomplish viewing of the second plurality of indicia segments on the chord wheel through the window means and further to align and determine correspondence between the information provided by the indicia on the chord wheel and that provided by the indicia on the fixed wheel of the frame. The chord wheel is rotatably mounted and, due to its larger size, is secured to an undersurface of the fixed wheel.

The assembly further comprises a note/key wheel having a third plurality of indicia segments formed substantially about the periphery thereof wherein such segments are note symbols each being formed at an outer end of an outwardly directed radially extending fineer. The fingers of the note/key wheel effectively define the periphery thereof and the fingers are specifically spaced a predetermined distance from one another so as to provide viewing through the defined spaces. Such viewing through the spaces allows for any one of the fingers to be aligned with a tonic position of the frame and window means associated therewith and allows for a user to view through the space and through a portion of the window means to align and correspond information from the second plurality of indicia segments with the first plurality of indicia segments. The note/key wheel is rotatably mounted on the front face of the fixed wheel of the frame and has a successively smaller transverse dimension than the chord wheel and fixed wheel respectively.

A major/minor wheel is rotatably mounted on the front surface of the chord/key wheel wherein the major/minor wheel, chord/key wheel, fixed wheel and chord/wheel are all disposed in coaxial relation to one another and all relatively rotatable. The major/minor wheel includes a major indicator and a minor indicator disposed a predetermined, preferably 90°, arcuate spaced from one another. The minor indicator cooperates with a sub-divided segment formed immediately contiguous or adjacent to the outer periphery of the major/minor wheel.

Each of the aforementioned wheels are specifically dimensioned and, as set forth above, coaxially disposed such that peripheries may be aligned by preselected rotation of one or more of the wheels relative to the other and to the fixed wheel of the frame for comparison of certain portions of the periphery.

An additional feature of the chord wheel and more specifically the second plurality of indicia elements thereon is that some are in fact color coded. These color codings are viewable through the aforementioned window means and comparable with certain color codings on the note/key wheel and such color codings are in fact comparable with the color coded chart formed on the exposed face of the base in order to determine which notes are used in a given chord.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figures 1, 6:
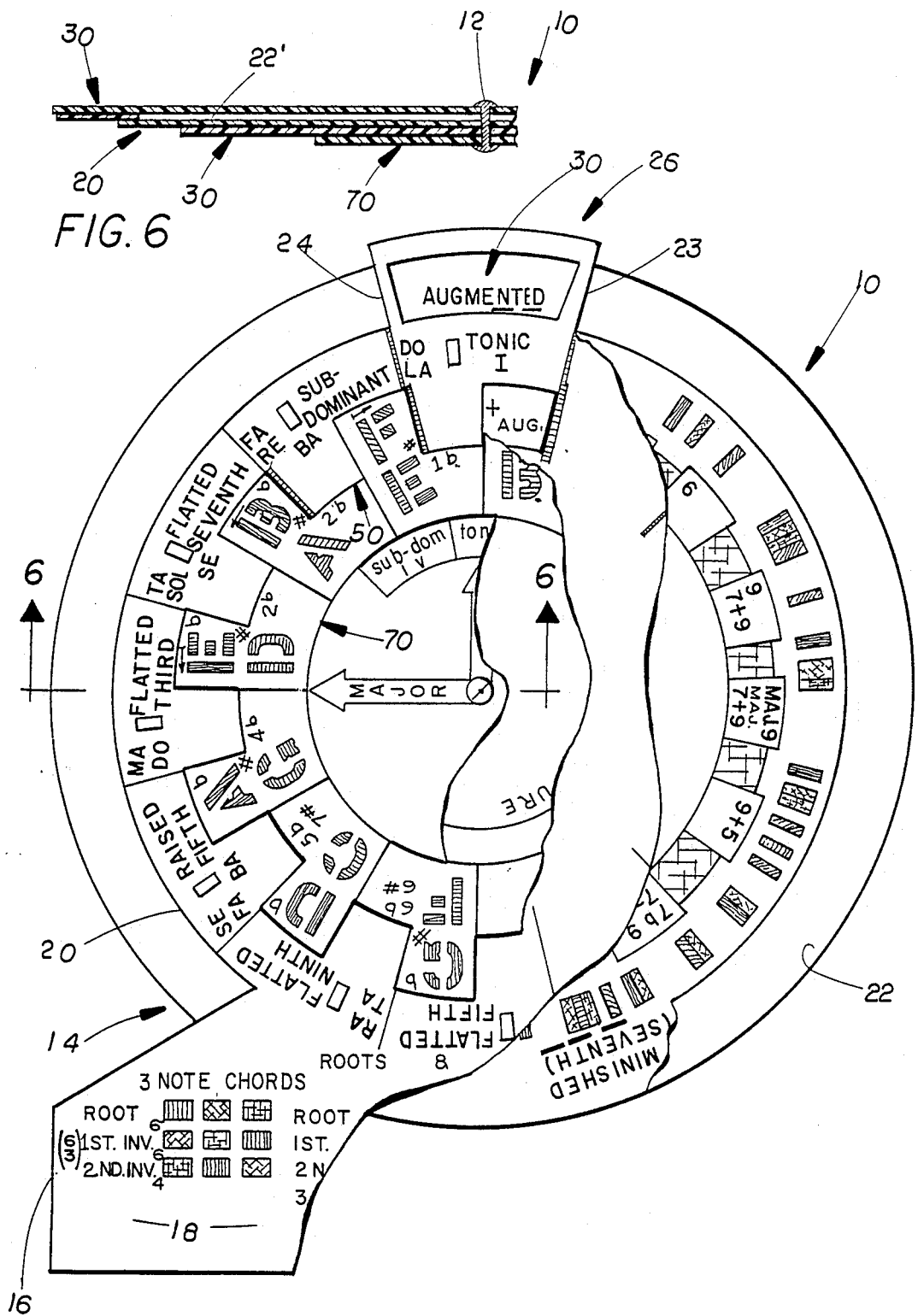
FIG. 1 is a front cutaway view showing the various components of the subject assembly.
FIG. 6 is a sectional view in partial cutaway along line 6—6 of FIG. 1 showing the relative positions of the various components including the various wheels of the subject assembly.
Figure 2:
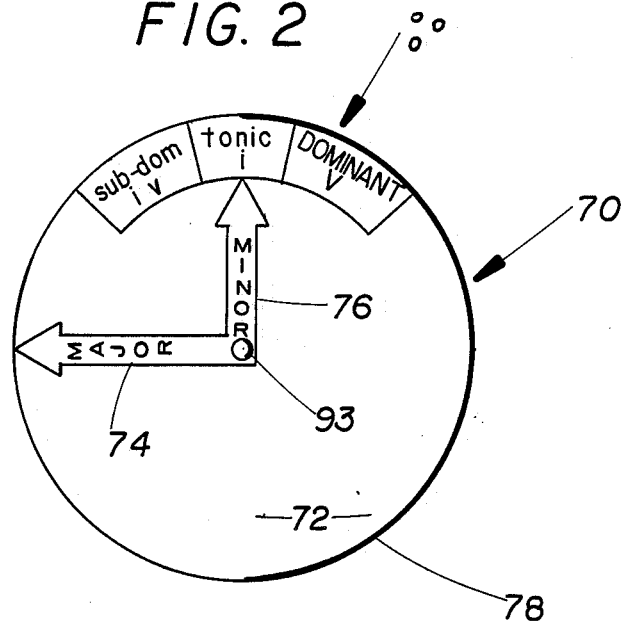
FIG. 2 is a front plan detailed view of a major/minor wheel of the assembly.

The present invention relates to a calculator assembly generally indicated as 10 in FIG. 1 and shown therein in its assembled form. For purposes of clarity, portions of the structural embodiment of FIG. 1 are cutaway to show the relative placement of the components, to be described in greater detail hereinafter to one another.

Similarly, FIG. 6 shows a cross-sectional view of the assembly in partial cutaway wherein the various components, to be indicated hereinafter in greater detail are represented. Suffice it to say, as represented primarily in FIG. 6, each of the components herein are coaxially disposed relative to one another by any type of common connector as at 12 which allows rotation of certain ones of the components or wheels relative to one another and to a support frame generally indicated as 14.

Figure 4:
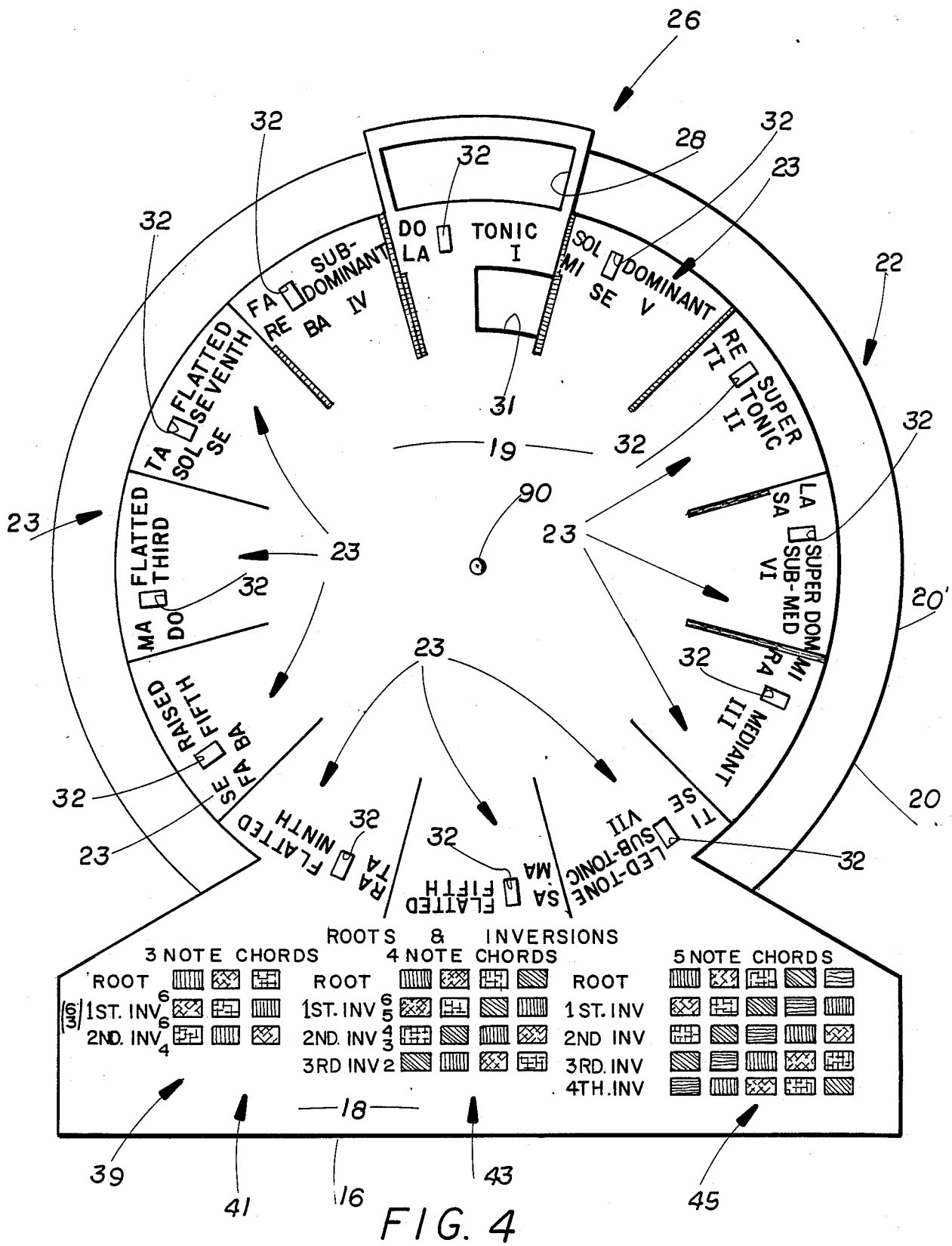
FIG. 4 is a front plan view in detail of the frame of the present invention.

The support frame 14 includes a base 16 having an exposed face 18 fixedly secured and extending outwardly from a fixed wheel 20 of the frame. An opaque material shield means as at 22 defines the outermost peripheral edge or portion of the fixed wheel and is mounted on the support frame such that opposite ends thereof as at 23 and 24 terminate in what may be considered a window means or assembly generally indicated as 26. Referring both to FIGS. 1 and 4, the frame 14 is shown absent the annularly configured shield 22 which may be somehow secured adjacent the immediate peripheral edge 20' of the fixed wheel 20 so as to obscure all peripheral portions of the chord wheel generally indicated as 30 in FIG. 5 not specifically aligned with the window means 26.

Again with regard to FIG. 4, the window means 26 comprises a primary window 28 extending outwardly from the peripheral edge 20' of the fixed wheel 20. The window means also comprises a secondary window 31 disposed radially inward of the primary window 28 and located on one indicia segment indicated in FIGS. 1 and 4 as TONIC I.

Also included in the structure of the chord wheel 22 is a plurality of bar windows 32 disposed in equally spaced relation to one another and specifically dimensioned to allow alignment and viewing of one of a plurality of color coded bars 33 associated with each segment of a second plurality of indicia segments being indicative of chords on the chord wheel and generally indicated as 34. The fixed wheel 20 also includes an exposed face 19 coplanar to the exposed face 18 on the base 16. A first plurality of indicia segments are disposed in a collectively annular configuration about the periphery of the exposed face 19 and are indicated generally as 23. Each of the indicia segments 23 are indicative of tonic, sub-dominant and dominant positions for chord progressions and transpositions. This is clearly indicated in FIG. 4.

Figure 5:
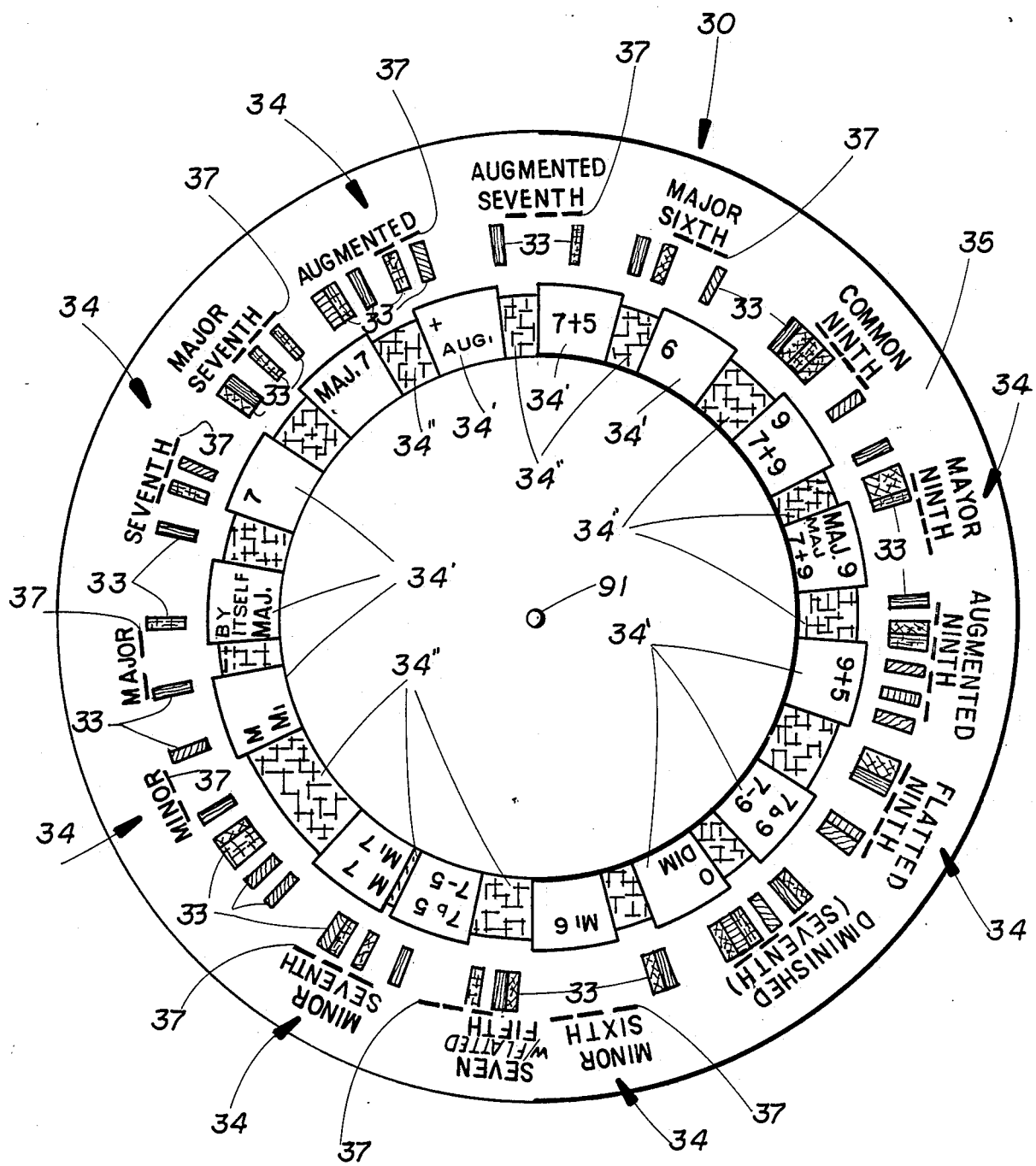
FIG. 5 is a front plan view in detail of the chord wheel.

FIG. 5 shows the details of the chord wheel generally indicated as 30 including the second plurality of indicia segments 34 also disposed in annular configuration about the periphery of the exposed face 35 of the chord wheel 30. More particularly, a first portion of the second plurality of indicia segments each include chord indications such as augmented seventh, major sixth, common ninth. A second portion of the second plurality of indicia segments comprises radially inward and somewhat offset chord symbols 34' relative to the primary portions. This offset radially inward disposition of the symbols 34' is such to allow the primary portions to be aligned with the primary window 28 and the secondary portions 34' to be aligned concurrently with the secondary window 31. In addition, the second portions are also disposed immediately adjacent to a color coding symbol 34'' which also may appear in the secondary window 31 and serve in part as a basis of conversion utilizing a color coded chart generally indicated as 39 which, in the embodiment shown in FIG. 4, is divided into three distinct but related categories 41, 43 and 45 each of which are color coded by a plurality of colored blotches or segments clearly indicated in FIG. 4. More specifically, category 41 is representative of the appropriate color coding of first and second inversions in 3-note chords, category 43 is representative of first, second and third inversions of 4-note chords, and category 45 is representative of first, second, third, and fourth inversions of 5-note chords.

Yet a third portion of the second plurality of indicia segments 34 are represented by a plurality of color coded bars 33. These bars are dimensioned, configured and disposed to be viewable through the bar windows 32 when the chord wheel is rotated to position the preselected and desired chord within the primary window 38. Concurrently, as set forth above, the color code of the bars 33 will be evident and viewable through the appropriate bar window 32 and the secondary chord indicator 34' will be concurrently viewable through the secondary window 31.

Figure 3:
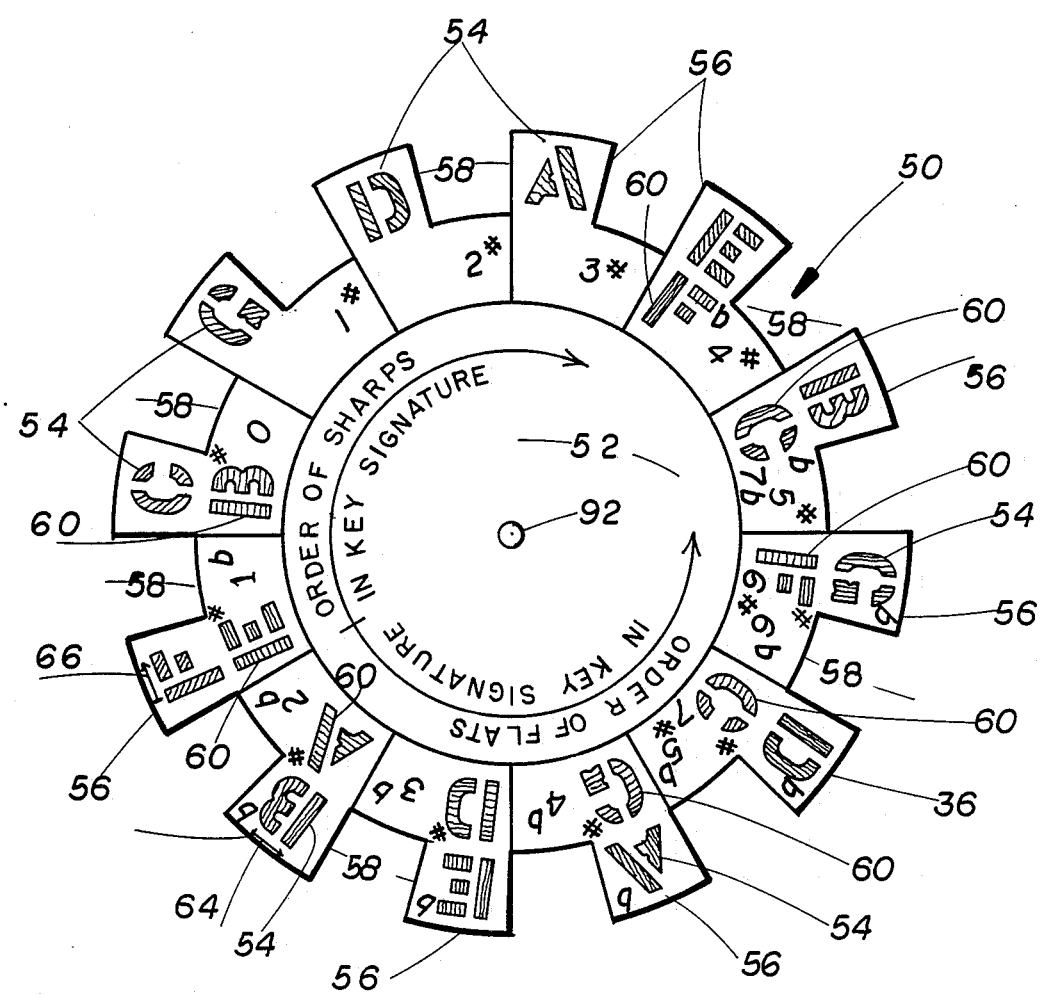
FIG. 3 is a front plan view in detail of the note/key wheel.

With regard to FIG. 3, a note/key wheel is generally indicated as 50 and includes an exposed face 52 having a third plurality of indicia segments in the form of note symbols 54 arranged on the outermost end of radially projecting fingers 56. Further, the fingers 56 are disposed in spaced relation to one another by equally dimensioned spaces 58. Each of the spaces are disposed and configured to allow concurrent viewing through the space 58, through the secondary window 31 onto the second plurality of indicia segments on the chord wheel 30 aligned with the secondary window 31.

The third plurality of indicia segments also includes sharp note indicators 60 in alignment with appropriate notes 54 in successive relation to one another as also shown in FIG. 3.

Finally, directional arrows 64 and 66 are mounted as indicated on FIG. 3 over appropriate chords b and f so as to properly indicate to the user respectively the order of flats in a given key signature as well as the order of sharps in a given key signature.

The final component of the subject assembly is generally indicated as 70 and includes a major/minor wheel having an exposed face 72. A major indicator 74 and a minor indictor 76 are disposed at a predetermined arcuate spacing from one another along the periphery as at 78 of the major/minor wheel wherein such spacing is preferably 90°. A sub-divided segment is formed along a portion of the peripheral edge 78 and is generally indicated as 80. This sub-divided segment is defined by a sub-dominant indicator, a tonic indicator and a dominant indicator.

As indicated above, each of the wheels are coaxially mounted through the provision of the connector 12 (see FIG. 6) passing through an appropriate centrally disposed aperture 90, 91, 92 and 93 formed respectively in the fixed wheel 22, the chord wheel 30, the note/key wheel 50 and the major/minor wheel 80. Generally, while the frame and fixed wheel associated therewith (see FIG. 4) is supposed to be fixed, each of the wheels are rotatable relative thereto and to one another. Further, an important feature of the present invention is the respective dimensioning of the wheels such that their peripheries correspond with one another and the indicia thereon is readable in a cooperative manner. The color coding of course is provided so as to allow comparison and conversions of the root and inversions chart 39 formed on the exposed face 18 of the base 16 as set forth above.

FIG. 6 discloses a preferred embodiment of the present invention wherein the chord wheel 30 is disposed rotatably about the undersurface 22' of the fixed wheel 22. The note/key wheel 50 is disposable in overlying rotatable relation to the front surface of the fixed wheel 22. Finally, the major/minor wheel 70 is rotatably mounted on the front face of the note/key whell.

For purposes of clarity, the reference numerals as set forth in detail above are more amply supplied to FIGS. 2 through 6. Such detailed reference numerals are deleted from FIG. 1, for the most part, in order to properly indicate the proper placement and workings of the assembly.

Yet another feature associated with the chord wheel of FIG. 5 is the incorporation of a plurality of linearly aligned color coded dashes 37 formed immediately beneath the chord indicator of the second plurality of indicia segments. Such dashes are provided under the indicated chord name to show how a chord is built using major and minor thirds. For example, a blue dash equals a major third and an indication of skipping three semi-tones. A red dash is an indication of a minor third and a skipping of two semi-tones. An orange/white dash is an indication of a whole tone and a skipping of one semi-tone.

The note/key wheel is operated by aligning the note wanted with the tonic position of the support frame. The color bars in the frame bar windows shows which notes are used in a given chord. The color chart 39 on the base 16 and more specifically on the exposed face 18 thereof is used as a root and inversion chart for order to make the appropriate conversions. The clockwise arrow 66 above the note f indicates direction and order of sharps and key signature (F,C,G,D,A,E,B) and also shows ascending fifths. The other directional arrow 64 disposed in a counterclockwise direction above Bb' indicates direction and order of flats in key signature (B,E,A,D,G,C,F) and also shows ascending fourths.

The major and minor wheel is used by aligning the major indicator 74 with the tonic position in the window means 26 (a straight 12 o'clock position). In such position, the minor indicator 76 will point to relative minor in the same key signature. To convert to a relative minor key, the major/minor wheel and the note/key wheels are rotated so that the minor indicator 76 points to the straight 12 o'clock position thereby necessitating that the major indicator 74 disposed at a 90° arc points to the key signature.

Now that the invention has been described,
What is claimed is:

1. A chord and key calculator assembly for musical composition comprising:
   (a) a support frame including a fixed wheel and a base portion fixedly secured to said fixed wheel and extending outwardly from a periphery thereof,
   (b) window means formed said fixed wheel for viewing therethrough and disposed substantially on the periphery thereof in spaced relation to said base portion,
   (c) a first plurality of indicia segments formed on an exposed face of said fixed wheel disposed continuously along the periphery thereof in cooperative relation to said window means,
   (d) said first plurality of indicia segments being indicative of tonic, sub-dominant and dominant positions for chord progressions and transposing,
   (e) a chord wheel rotationally secured to said frame and disposed and dimensioned to have peripheral portions thereof viewable through said window means,
   (f) a second plurality of indicia segments formed on an exposed face along said peripheral portion of said chord wheel in alignable relation with said window means and being indicative of a plurality of chords,
   (g) a note/key wheel rotationally secured to said frame and rotatable relative thereto and to said chord wheel and including a third plurality of indicia segments formed on an exposed face along a periphery thereof and positionable in registerable alignment relative to said first plurality of indicia segments, said third plurality of indicia segments being indicative of a plurality of notes, and
   (h) a major/minor wheel rotationally secured to said frame and rotatable relative thereto and to each of the other wheels, said major/minor wheel including a major indicator and a minor indicator disposed in a predetermined arcuate distance from one another along a periphery of said major/minor wheel.

2. An assembly as in claim 1 wherein said window means comprises a primary window disposed in alignable relation with a primary portion of said second plurality of indicia segments upon rotation of said chord wheel relative thereto, said second plurality of indicia segments being viewable therethrough.

3. An assembly as in claim 2 wherein said window means comprises a secondary window spaced radially inward from said primary winow and disposed in alignable relation to a secondary portion of said second plurality of indicia segments.

4. An assembly as in claim 3 wherein said primary and secondary portions of said secondary indicia segments are both indicative of the plurality of chords and disposed to concurrently align with the same chord in both said primary and secondary windows.

5. An assembly as in claim 3 wherein said window means comprises a plurality of bar windows collectively defining an annular configuration about the periphery of said frame and disposed between said primary and secondary windows, each of said bar windows cooperatively disposed in aligned relation with a first plurality of color coded segments defining a part of said second plurality of indicia segments.

6. An assembly as in claim 5 wherein said periphery of said note/key wheel comprises a plurality of fingers extending radially outward and in spaced relation to one another continuously about said periphery of said note/key wheel, each of said plurality of spaces between said plurality of fingers disposed and dimensioned in aligned viewing relation with said secondary window.

7. An assembly as in claim 6 wherein said secondary portion of said secondary plurality of indicia segments is viewable through aligned ones of said spaces and said secondary window.

8. An assembly as in claim 7 wherein one of a plurality of note symbols are formed on each of said symbols immediately adjacent a corresponding one of said spaces.

9. An assembly as in claim 8 wherein some of said first note symbols are aligned with radially inward position ones of corresponding note sharp symbols.

10. An assembly as in claim 8 wherein two directional arrows signals are formed on the exposed face of said note/key wheel, one directional arrow being indicative of an order of sharps and the other of said directional arrows being indicative of an order of flats; each directional arrow pointed in an opposite direction of rotation.

11. An assembly as in claim 8 wherein said major/minor wheel includes a sub-divided segment formed adjacent an outer peripheral edge thereof and being cooperatively disposed relative to said minor indicator on said major/minor wheel.

12. An assembly as in claim 11 wherein said sub-divided segment is respectively defined by divisions comprising sub-dominant, tonic and dominant division disposable in alignable relation with selected portions of said third plurality of indicia segments.

13. An assembly as in claim 1 wherein said base portion comprises a color coded chart formed on an exposed surface thereof and defining a conversion scale for roots and inversions.

14. An assembly as in claim 13 wherein said scale comprises three categories including a first and a second inversion for 3-note chords; a first, second, third inversions for 4-note chords, and a first, second, third, fourth inversions for 5-note chords.

15. An assembly as in claim 14 wherein said second plurality of indicia segments comprises a first portion indicative of chords; a second portion being color coded and indicative of chords, and a third portion being color coded.

16. An assembly as in claim 15 wherein said first portion additionally includes linear spaced dashes disposed immediately beneath chord indicators wherein said plurality of dashes are color coded and indicative of chord instructions using major/minor thirds.

17. An assembly as in claim 16 wherein said window means comprises a primary window disposed in alignable relation with the primary portion of said second plurality of indicia segments upon rotation of said chord wheel relative thereto, said second plurality of indicia segments being viewable therethrough and said primary window dimensioned an configured to include views of said dashes.

18. An assembly as in claim 16 wherein said color coded indicia on said chord wheel is comparable to said color coded chart of said base to determine note usage in a given chord.

19. An assembly as in claim 1 wherein said chord wheel has a larger diameter than any of the other of said note-key wheel, major/minor wheel or fixed wheel on said frame.

20. An assembly as in claim 19 wherein said chord wheel is rotatably secured to an undersurface portion of said frame, said note/key wheel is rotatably secured to a front surface of said frame and has a lesser diameter than said fixed wheel, said major/minor wheel is rotatably secured to a front surface of said note/key wheel; said diameters of said chord wheel, fixed wheel, note/key wheel and major/minor wheel are respectively dimensioned to successively align peripheral portions of each wheel with any of the next adjacent wheels for chord/key calculation.

* * * * *